No. 686,558. Patented Nov. 12, 1901.
E. THOMSON.
APPARATUS FOR MANUFACTURING TUBES, PIPES, &c.
(Application filed Feb. 15, 1897.)
(No Model.)
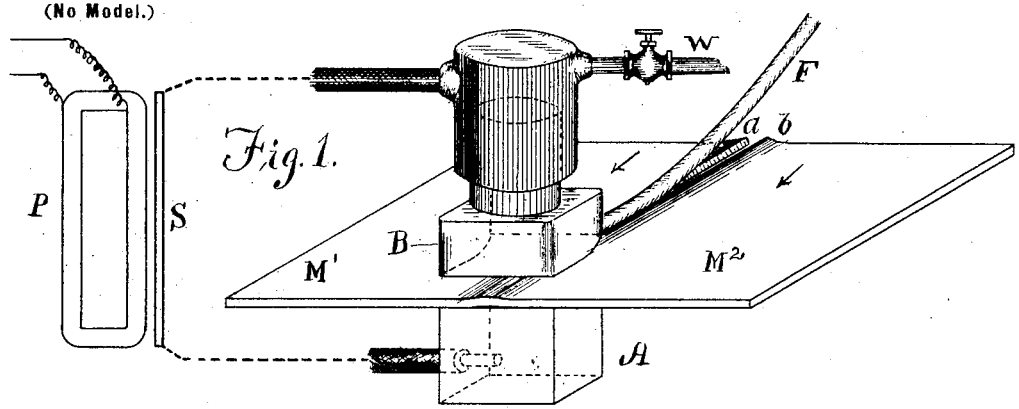
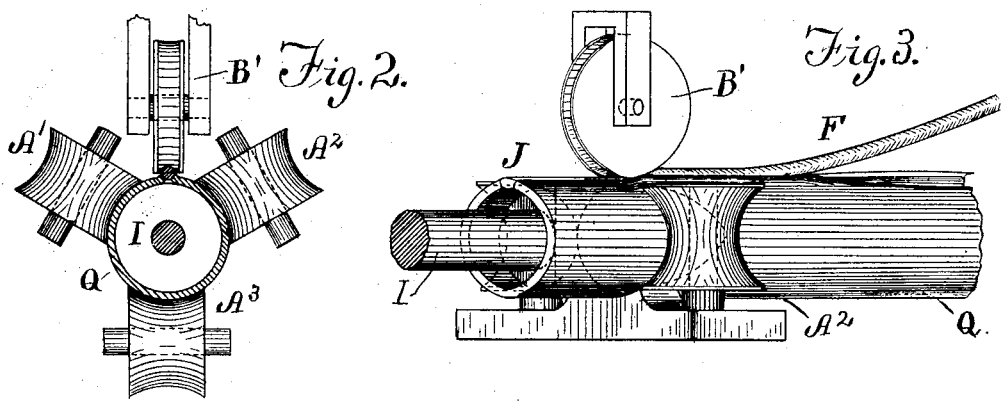
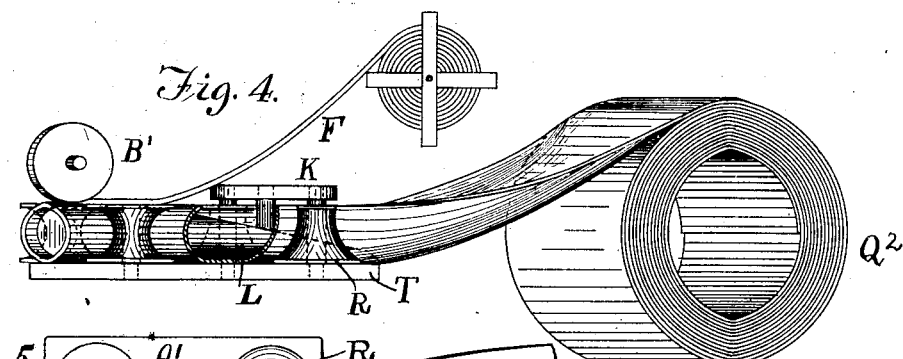
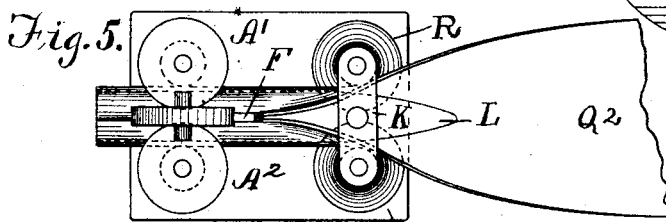

UNITED STATES PATENT OFFICE.

ELIHU THOMSON, OF SWAMPSCOTT, MASSACHUSETTS.

APPARATUS FOR MANUFACTURING TUBES, PIPES, &c.

SPECIFICATION forming part of Letters Patent No. 686,558, dated November 12, 1901.

Application filed February 15, 1897. Serial No. 623,374. (No model.)

*To all whom it may concern:*

Be it known that I, ELIHU THOMSON, a citizen of the United States, and a resident of Swampscott, in the county of Essex and State of Massachusetts, have invented a certain new and useful Apparatus for the Manufacture of Tubes, Pipes, &c., of which the following is a specification.

My present invention relates to a novel apparatus for joining the edges of a metal sheet or sheets together, and is applicable to the joining of separate sheets or plates of metal or to the joining of the two opposite edges of a single strip or sheet formed or shaped so that its two edges shall approximate.

My invention is especially useful for the production of pipes by forming or rolling up a strip or skelp into a cylindrical or other hollow form and making a longitudinal joint or seam between the longitudinal approximated edges.

The object of my invention is to form a union which shall be practically as one piece of metal with the body or bodies whose edges are joined and which shall be superior in strength, homogeneity, ease of formation, and other particulars to the joints as heretofore made by brazing the edges together or by attempting to weld them directly to one another.

My invention therefore consists in the construction, combination, and arrangement of parts, as hereinafter fully described and set forth.

Briefly, my invention is carried out by approximating the edges to be joined, preferably slightly upturning them, so that they are in contact or nearly in contact, laying a strip or wire of a metal which is adapted to be joined by welding to the metal of the pieces to be united along the line of the joint, passing an electric current by suitable contact-pieces transversely or laterally through the wire or strip laid in the joint and through the edges against which the wire is laid and in volume sufficient to bring the material of the wire and edges to the welding temperature, and then applying pressure, preferably by the contact-piece, to cause the edges and the wire or strip to weld or unite together to form one piece, thus completing the joint.

In forming a pipe according to my invention a strip or piece of sheet metal is rolled up into the form of a hollow cylinder, with the edges meeting to produce a seam, or in other cases a spiral seam may be formed. Into this seam or joint is fed a wire or thin strip of the same metal or one allied thereto, and under the pressure of current-conveying contact-rolls the wire is flattened and pressed into the same, at which time union takes place under the pressure and electric heating to complete the same and make it as one piece of metal, thus giving rise to a complete pipe or tube.

My invention will be understood by reference to the accompanying drawings, wherein—

Figure 1 shows the application of my invention to joining the edges of two pieces of sheet metal placed alongside, this figure illustrating the principle of my invention, broadly considered. Figs. 2 and 3 show the application of the same method in the formation of a metal pipe or tube. Figs. 4 and 5 show the application of the invention to the production of continuous lengths of pipe from strips rolled up and almost simultaneously welded at the joint. Fig. 6 shows in detail a part of the apparatus.

The source of electricity which heats the metal to welding temperature may be of any desired character. Preferably a transformer whose secondary is connected to the work is employed.

In Fig. 1, P represents the primary coil of a welding-transformer such as is commonly used to induce in a secondary conductor forming part of a welding-circuit a heavy current of low voltage and great heating power on account of the flow of current being large. These coils are wound upon or provided with laminated-iron cores, and the primary P is connected with the source of alternating currents. The usual switching devices for controlling the current in said primary, with means for increasing or diminishing the flow of current, for cutting off the same, for gradually increasing, or, in other words, in every way controlling the current in well-known ways suitable to this and other uses are employed.

The parts P and S in Fig. 1 are merely diagrammatic and do not, of course, represent these parts in their actual working proportion. The secondary conductor S has its terminals one at A, consisting of a heavy conductor of good conducting metal, and another at B, or a similar heavy block of conducting metal pressed toward A during operation. The work is inserted between these two terminals or blocks, and the pressure of one toward the other may be effected by springs, air or water pressure, or other suitable power. In the figure is indicated the piston of a hydraulic press attached to B and serving to force the same downward by a regulated pressure, as determined by the head of the water passing through the pipe W under suitable control. The terminal of S not attached to A may be led directly to B by slightly-flexible conductors, or if the contact of the piston-head B with the sides of the cylinder is enough the connection may be made, as shown in the figure, to the cylinder itself. It is to be understood that suitable supports (not shown in the figures) are provided for the part A and parts accompanying B, whereby they are held in proper juxtaposition and cannot be displaced relatively during the operation. The two pieces of sheet metal M' and M², whose edges may be slightly upturned, as at $a$ $b$, are held together in any suitable way, either manually or by suitable clamps, so that their edges where they are approximated or where they meet may be passed under the block B or between it and the terminal block A. A strip of wire F, of metal, the same as M' M² or similar thereto, is extended so as to lie over the notch, slot, or groove between the sheets and be forced into said slot by the pressure of the piece B, while the pieces M' M² are traversed in the direction indicated by the arrows under the block B. At the same time a heavy current is caused to pass between B and A, so as to heat the strip and the metal pieces at the joint. This is effected all the more surely because of the strip F and the upturned edges of the plates M' M², causing a sort of elevation or ridge to which the flow of current is naturally limited, as being the only place of actual contact. The forward corner or edge of the face of the block B is preferably beveled, chamfered, sloped, or rounded in such a way that as the pieces M' M² are traversed in the direction of the arrow a sort of flattening-down process is carried out whereby the wire or strip F is, as it were, depressed gradually into the joint as it heats, thus effectually uniting the parts. The pressures and currents will be adjusted to that amount which allows the work to be just completed as the joint itself progresses from under the block B. In other words, the welding temperature will be reached under the block by the passage of current laterally through the wire F—say from the block B—thence through the edge of the sheets on which the wire lies, and thence to the block A underneath the sheets. The operation, in fact, consists in making the strip F highly plastic while bringing the edge of the sheets to a plastic condition, whereby a complete union of the parts is effected, together with the compression of the progressively-formed joint when the pieces are moved under the block B.

My invention is particularly useful in forming metal tubes or pipes, say, of mild steel or wrought-iron. Figs. 2 and 3 show the manner of operation in this case. The strip of sheet metal which is to form the pipe is bent upward in the form of a hollow cylinder, with the edges meeting or almost meeting along the side, and with these edges preferably slightly turned toward the direction of application of a longitudinal strip or wire which yields a plastic material for the joint when heated electrically. Thus in Figs. 2 and 3 an upper pressure contact-roll B', connected with a source of current and made of good conducting material, bears such a relation to the work that as it passes beneath the same current is delivered in such a way as to heat the strip F fed into the joint and soften the same, uniting it with the upturned edges of the sheet metal and finishing the joint, as at J. The other contacts for current—that is, for completing the circuit and which take the place of the part A, Fig. 1—are contact-rolls A' A², and sometimes A³ may be included, or, as in Fig. 3, the roll A³ might be replaced by a simple surface for the under side of the pipe to slide upon. In fact, all the rolls in this instance may be replaced by sliding shoes or surfaces borne against the sides of the pipe, so as to effect proper contact. If the rolls A' A², Fig. 2, be connected with one terminal of a source of current and B' with the other, then the course of the current is through the strip F laterally and through the meeting edges of the cylinder or pipe, producing a high temperature at this point, causing yielding of the metal and welding the same, while if the pipe be pushed gradually by any suitable means past the point of application of current and heat the welding or union is progressively effected. It is desirable in some cases to insert a mandrel within the pipe Q—as indicated at I, for example— sustaining the interior and finishing the same when the heat is on. This mandrel may be supported in the ordinary way upon long rods, as in other operations of pipe-making, and may be shaped to favor the passage of the material over it.

Figs. 4 and 5 are diagrams showing how the process just described may be employed to form a long or continuous pipe. The current-carrying roll B' is placed as before for pressing down and supplying current for the formation of the joint by the strip F, fed therein from a suitable roll, while a table T serves as the support for the bending and shaping rolls, which act laterally upon the strip Q² as it is unwound from a large reel held upon a suitable drum or spindle. At K is a proper support for a mandrel, which enters the slot before the completion of the upturning of the edges and is sustained in one position continually. This will be more clearly understood by reference to the plan views in Figs. 5 and 6. K is the support for the mandrel L, which takes the form of an elongated piece resting at the right on the bottom of the groove or channel formed by the upturning of the sheet $Q^2$, and filling on the left the space within the tube and under the roller $B'$ and between the rollers $A'$ and $A^2$. Other rollers, as R R, are indicated as acting to guide and to bend the sheet $Q^2$. The progress of the piece $Q^2$ may be effected in any desired way, as by clamp-rolls moved at a certain determined rate, depending upon the energy of the current used, or the pipe itself may be dragged mechanically between the rolls and bent at the same time by the operation of drawing through. The rate at which the movement is effected depends upon the rate of delivery of current energy from the roller $B'$, moving along the strip and pipe.

It is to be understood that the expedients of water-cooling by water circulation may be applied to the parts, such as to the rolls conveying the current or surfaces in contact with the metal being worked, to avoid overheating the same by accumulation of heat therein during the process.

What I claim as my invention is—

1. An apparatus for making a metal tube consisting in the combination of means for bending a sheet of metal into tubular form and slightly upturning and approximating the edges thereof, means for feeding between said upturned edges a strip of material adapted to be joined with the metal of said edges by welding, and electrical contacts for passing a heating electric current through the approximated edges and the inserted strip and adapted to apply pressure to said edges and strip to assist in consolidating them substantially as set forth.

2. In an apparatus for making continuous metal tubing, the combination, substantially as described, of means for forming a continuous sheet of metal into tubular form by bending and approximating its edges, means for feeding a strip of material adapted to be welded to the sheet in the joint or space between its edges, pressure devices between which the material thus formed and assembled is continuously fed, a mandrel within the forming-tube, and means for passing a heavy current of electricity through said pressure devices and said material, said current being of volume sufficient to heat the material of the strip and approximated edges to a welding temperature.

3. The combination with a suitable support, of the lateral tube-forming rolls $A'$, $A^2$ and R, adapted to bend a strip of metal into tubular form, a mandrel suspended within the space between said rolls and about which the tube is formed, means for feeding a welding-strip between the edges of the sheet, and a pressure-roll acting in conjunction with the mandrel to force said strip into intimate contact with the edges of the tubular sheet, substantially as set forth.

4. In an apparatus for making metal tubes from a sheet of metal, the combination of forming-rolls between which the tube passes, of a mandrel within the tube, a pressure-roll acting in conjunction with the mandrel, means for feeding a strip of metal into the joint or space between the edges of the sheet forming the tube and means for passing a heavy electric current through said pressure device, said strip and the portions of the sheet adjacent thereto, for the purpose set forth.

Signed at Lynn, Massachusetts, in the county of Essex, this 30th day of January, A. D. 1897.

ELIHU THOMSON.

Witnesses:
JOHN W. GIBBONEY,
HENRY O. WESTENDARF.